Dec. 22, 1964  M. KELLER  3,162,091
ATTACHMENT FOR MILLING MACHINES
Filed June 3, 1963  2 Sheets-Sheet 1
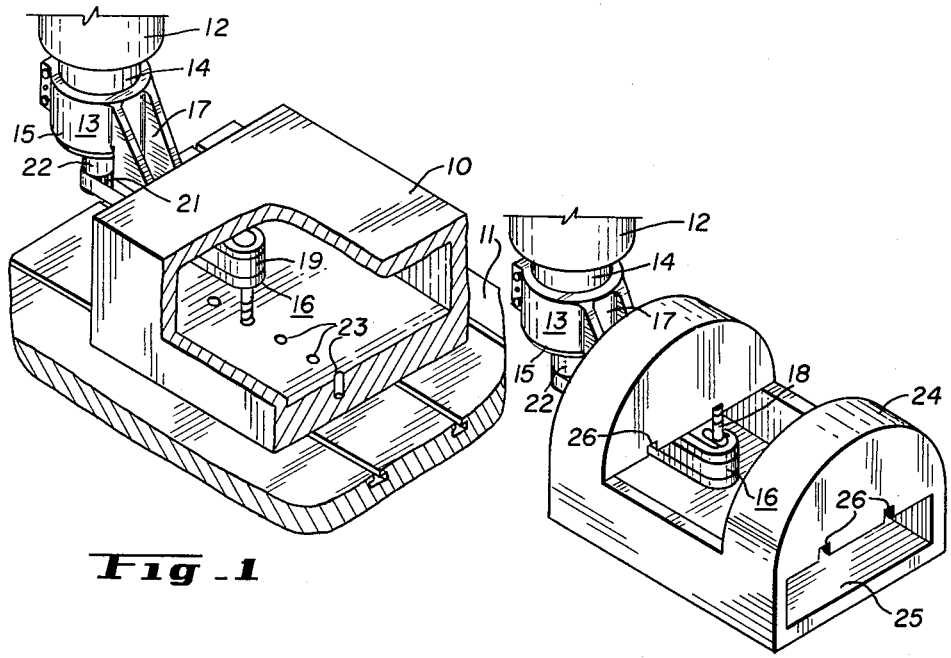
Fig_1
Fig_2
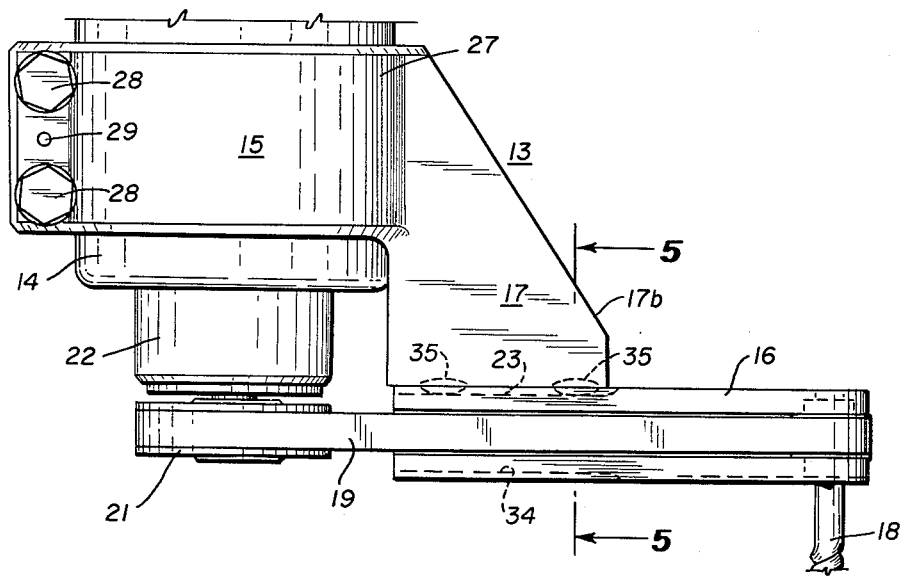
Fig_3
INVENTOR.
Martin Keller
BY
ATTORNEYS Dec. 22, 1964     M. KELLER     3,162,091
ATTACHMENT FOR MILLING MACHINES
Filed June 3, 1963     2 Sheets-Sheet 2
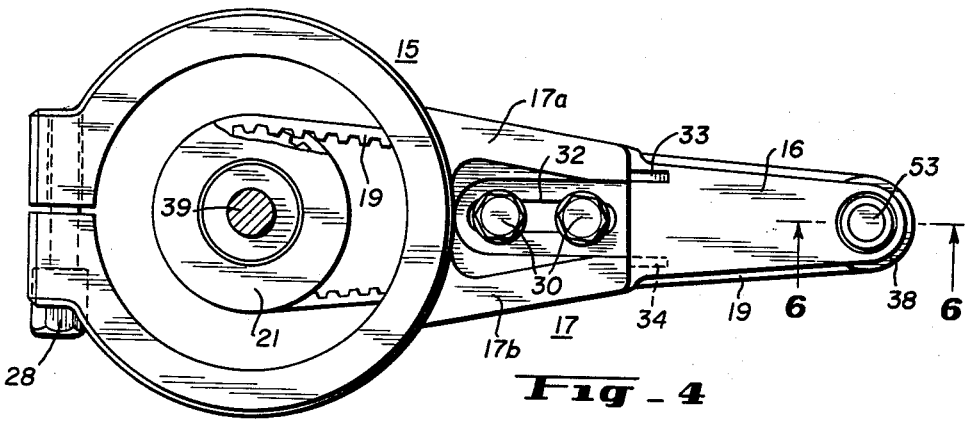
Fig_4
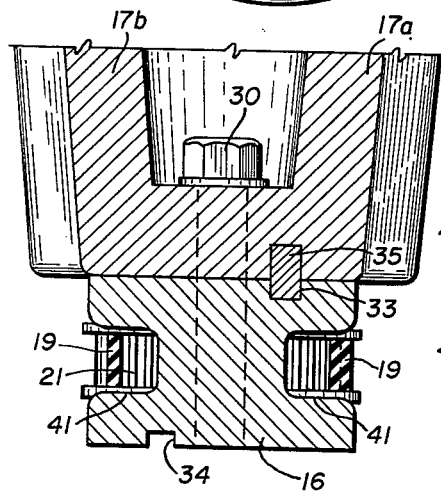
Fig_5
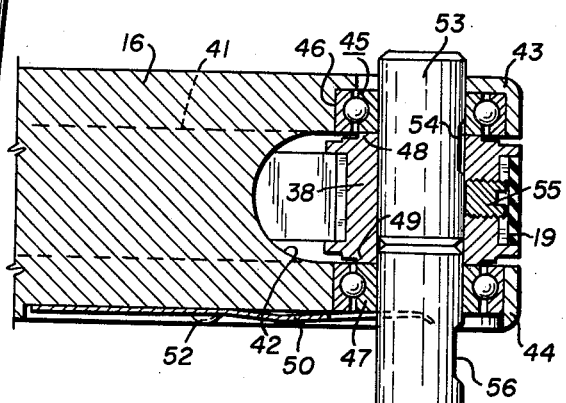
Fig_6
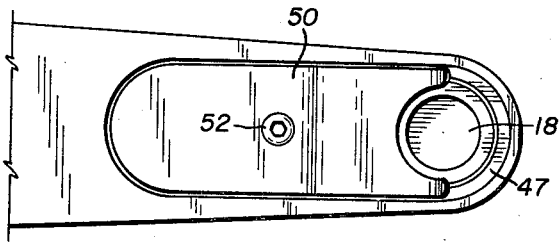
Fig_7
INVENTOR.
Martin Keller
BY
ATTORNEYS

United States Patent Office 3,162,091
Patented Dec. 22, 1964

3,162,091
ATTACHMENT FOR MILLING MACHINES
Martin Keller, Golden, Colo., assignor to K-F Products, Inc., Denver, Colo., a corporation of Colorado
Filed June 3, 1963, Ser. No. 284,998
3 Claims. (Cl. 90—17)

This invention relates to milling machines and the like and particularly to an improved offset attachment for vertical milling machines.

The milling machines available today are highly useful for many operations; however, they are limited to operations which may be performed by movement of the work into engagement with a milling cutter mounted on the head of the machine and turning on a fixed axis. Thus the standard milling machine is not adapted for use in cramped or recessed portions of the work, and it has been the practice to provide other types of machine tools, such as shapers and slotters, for this type of work. It is desirable to minimize the number of machine tools required for any one piece of work and accordingly it is an object of this invention to provide an improved attachment for milling machines and the like for increasing the number of operations which may be performed on the machine.

It is another object of this invention to provide an improved offset milling attachment for milling machines and the like.

It is another object of this invention to provide an improved attachment for milling machines for utilizing a milling machine for internal milling, drilling, grooving, slotting and the like.

It is another object of this invention to provide an improved bearing assembly and mounting for milling cutters for accurately securing a cutter to facilitate precision operations thereof.

Briefly, in carrying out the objects of this invention in one embodiment thereof, an adapter or fixture is provided which may be securely and rigidly attached to the quill of a milling machine and an offset arm is mounted on the adapter. A drive wheel or sprocket is mounted in the collet of the machine and a bearing assembly is provided on the outer end of the arm and arranged to receive and secure a driven wheel and a milling cutter. A suitable belt or chain is provided to connect the wheels. The bearing assembly is arranged to utilize the shank of the milling cutter as the driven wheel shaft and to hold the cutter securely in a precise and centered position in the assembly. The bearing assembly is arranged to transmit the axial thrust of the cutter and the offset arm may be reversed in position so that the cutter may be operated on either the upper or lower side of the arm.

The features of novelty which characterize this invention are pointed out with particularity in the claims annexed to and forming a part of this specification. The invention itself, however, both as to its organization and method of operation, together with further objects and advantages thereof will be better understood upon reference to the following description taken in connection with the accompanying drawings in which:

FIG. 1 is an isometric view partly broken away showing an attachment embodying the invention mounted on a vertical milling machine for operation on a workpiece requiring internal drilling;

FIG. 2 is a view similar to FIG. 1 showing the attachment of the invention in its reversed position arranged to effect internal slotting;

FIG. 3 is an enlarged side elevation view of the attachment shown in FIG. 1;

FIG. 4 is a top view of the attachment of FIG. 3;

FIG. 5 is an enlarged sectional view along the line 5—5 of FIG. 3;

FIG. 6 is an enlarged sectional view along the line 6—6 of FIG. 4; and

FIG. 7 is a bottom plan view of the portion of the attachment shown in FIG. 6.

Referring now to the drawings, FIG. 1 illustrates a workpiece 10 mounted on a table 11 of a vertical milling machine, the lower portion of the head of which is indicated at 12. An attachment 13 embodying the invention is secured rigidly to the quill of the milling machine indicated at 14. The attachment 13 comprises an adapter 15 which is removably secured to the quill 14 and an offset arm 16 detachably secured to a rigid side bracket 17 of the adapter 15; the arm has been shown extending into a chamber or recess within the work 10. The arm 16 is provided with an arrangement for securing a milling cutter 18 in driving position at the end of the arm, the drive being effected by a belt or chain 19 driven by a drive wheel or sprocket 21 secured in the chuck or collet 22 of the milling machine.

The arm 16 has been shown in position for drilling internal holes, a plurality of which are indicated at 23 in the bottom wall of the interior chamber in the workpiece 10. It is thus apparent that the offset assembly makes it possible to effect milling operations in portions of workpieces which are normally inaccessible to the standard milling machine.

As shown in FIG. 2, the arm 16 may be reversed in position so that the milling cutter 18 extends upwardly and may be employed for operations in the upper wall of a passage within a workpiece such as that indicated at 24. The workpiece 24 has a flat bottom surface readily adapted to securing the piece to the worktable and a rounded or curved top surface, thus making it desirable to clamp the bottom surface to the table and work on the upper surface of the interior passage indicated at 25. In FIG. 2 the cutter 18 has been shown in operation to cut slots shown at 26.

The bearing assembly for the cutter 18 is so constructed that the thrust of the cutter is carried by the assembly and all play or lost motion is taken up against thrust bearings in a manner which will be understood from the detailed description of the assembly which follows.

As shown in FIGS. 3 and 4, the adapter assembly 15 comprises a cylindrical gripping portion 27 of the split ring type comprising two integral semicircular sides or jaws which may be clamped securely about the quill 14 by bolts 28. A locking screw 29 is also provided between the bolts so that after they are secured and positioned this screw may be tightened to clamp the jaws securely against the bolts 28 in their tightened positions. The screw 29 is, of course, loosened so that it is out of the way during the clamping operation and also is released before removal of the adapter from the quill. The offset arm 17 of the adapter 15 comprises two rigid load supporting angle portions indicated at 17a and 17b. An arm 16 is attached to the offset arm 17 by two machine screws 30 which enter corresponding threaded holes in the arm 16 and are adjustably positioned in a slot 32 in the offset arm 17. The adjustment of the screws 30 in the slot 32 is provided in order to secure the desired tension in the belt 19.

In order to assure precise alignment of the arm 16 along its central axis, the arm is provided with a machined slot 33 on its top surface, as shown in FIG. 4, and with a similar slot 34 in its bottom surface. These slots are on the opposite sides of the central axis of the arm as viewed from the top so that when the arm is rotated about its longitudinal axis a respective one of the slots is in position to engage a pair of aligned keys 35 which are rigidly secured on the bottom face of the arm 17.

The milling cutter 18 is mounted in the end of the arm 16 to be driven directly by a driven wheel or sprocket 38 which is connected by the belt 19 to the drive wheel 21. The belt 19 is of the positive drive type having ridges or teeth for engagement with corresponding grooves or teeth in each of the wheels 21 and 38, a portion of the teeth of the wheel 21 being shown in the broken away section of the wheel in FIG. 4. The wheel 21 includes a shaft 39 on which it is rigidly secured and which is securely centered and detachably mounted in the collet 22 of the milling machine. The adapter 15 and the rigid bracket 17 attached thereto provide a solid and rigid support for the arm 16 and make it possible to employ the tool 18 in its offset position for a wide range of precision operations including those such as illustrated in FIGS. 1 and 2.

As shown in FIGS. 5 and 6, the arm 16 is provided with longitudinal grooves or recesses 41 extending along its sides and accommodating the belt 19 so that its driving surface is protected from accidental contact.

In order to assure precision operation of the offset milling cutter, the bearing assembly at the outer end of the arm 16 is constructed so that the cutter may be mounted with great accuracy in the bearings and maintained in its operating position without play or lost motion. This precision mounting arrangement is accomplished by employing the shank of the cutter as the shaft for the sprocket 38, the sprocket having an internal diameter to fit the shaft and the sprocket bearings mounted in the arm also fitting the shaft in the same manner.

The outer end of the arm 16 is bifurcated by providing a slot or recess 42 forming an upper bearing support or finger 43 and a similar lower support or finger 44. The upper support is machined to provide a cylindrical bearing seat having a diameter equal to that of the upper bearing assembly indicated at 45 and including a shoulder 46 at the top end against which the bearing assembly is seated. The lower bearing indicated at 47 is fitted within a cylindrical recess in the lower arm 44 and which is concentric with the axis of the upper bearing seat. The bearings are pressed into their respective recesses.

The driven wheel 38 is provided with upper and lower bosses 48 and 49 which engage the inner races of the bearings 45 and 47. When the wheel is in position as shown in FIG. 6, its hub engages both the inner races and the outer bearing assembly is pressed toward the wheel 38 by a bifurcated spring 50 secured to the underside of the arm 16 and held under pressure by a machine screw 52. Thus the axial thrust of the spring 50 upwardly as shown in FIG. 6 is carried through the bottom bearing assembly, the hub of the wheel 38, and the top bearing assembly to the shoulder 46, and if the bearings should become loose in their recesses due to temperature changes for example, the spring will hold them in assembled relationship with the pulley.

The driven wheel and bearing assembly as illustrated is provided with a keeper shaft 53 having a flat 54 which is engaged by a set screw 55 in the wheel for securing the wheel to the keeper shaft. The keeper shaft is provided in order to maintain the pulley and bearings in alignment during the insertion and removal of the cutting tool and, as shown in FIG. 6, the cutting tool 18 has its shank inserted in the assembly to a position where it has pressed the keeper 53 part way out of its position, the set screw having been backed out for this purpose. Thus in the position of the parts in FIG. 6 the upper bearing and wheel are retained in alignment by the keeper 53 while the lower bearing and wheel are maintained in alignment by the shank of the tool 18. The tool is then pressed upwardly until it is in position so that a flat on the shank indicated at 56 is opposite the set screw 55 whereupon the set screw is tightened to secure the tool in place.

It will now be evident that any upward thrust produced by operation of the tool 18 will be carried through the assembly against the shoulder 46. Furthermore, no lost motion is present and the shank of the tool which closely fits the wheel and bearing assembly is maintained accurately in position. As a result accurate machining operations may be effected with the offset assembly.

The bearing assemblies 45 and 47 are of the shielded ball bearing type and chips or dust from the milling operations are prevented from entering the bearings. During operation the ends of the spring 50 are pressed against the bearing assembly 47 and hold it resiliently in position so that the force or thrust of the spring is transmitted through the bearing 47 to the wheel 38 and thence to the bearing 45 and shoulder 46.

During the operation of the offset attachment the cutter 18 is always secured in a position so that it extends from the side of the arm opposite that of the shoulder 46 and thus the thrust of the cutter is always exerted against the shoulder and the cutter is precisely positioned with respect to the arm 16. When the cutter is being employed for work as indicated in FIG. 1, it is secured to extend downwardly, the shoulder 46 being at the top, and when it is to be employed for work as indicated in FIG. 2, the arm 16 is rotated 180° about its longitudinal axis so that the shoulder 46 is at the bottom and receives the downward thrust of the cutter.

It will readily be understood that the speed of the cutter is determined by the ratio of the sprocket wheels 21 and 38 and that the offset attachment as illustrated is capable of a wide range of uses for operations which cannot be performed on the conventional milling machine. In order to increase the flexibility of the attachment, various sizes of arms 16 may be provided for connection to the adapter 15 and in this manner provision may be made for using various sizes of milling cutters having different shank diameters, the bearing and wheel assembly at the outer end of the arm, of course, being constructed to receive only a single diameter of tool shank.

The keeper shaft 53 makes it possible to maintain precision alignment of the wheel 38 and the bearings and minimizes the likelihood of damage to the bearing and wheel assembly during the use of the attachment. Construction of the arm 16 so that it may be reversed in position assures the maintenance of a precision operation by positioning the cutter always so that the thrust is carried directly through the assembly to the shoulder 46.

While the invention has been described in connection with a specific embodiment of the milling attachment, various other modifications and applications would occur to those skilled in the art. Therefore, it is not desired that the invention be limited to the details of construction illustrated and described and it is intended by the appended claims to cover all modifications which fall within the spirit and scope of the invention.

I claim:

1. An offset attachment for milling machines and the like comprising a rigid arm, means for securing said arm to the quill of a milling machine in a position extending laterally therefrom, a drive wheel having a shaft for mounting in the collet of a milling machine, a driven wheel, a bearing assembly on the outer end of said arm for mounting a shaft for rotation on an axis parallel to that of the machine, said bearing assembly comprising two aligned bearings spaced apart to receive said driven wheel therebetween, said arm having a recess therein between said bearings for affording insertion and removal of the driven wheel transversely of the axis of said bearings, said bearings and said driven wheel having aligned shaft openings of the same diameter as that of the shank of a tool to be mounted in said bearings, a keeper shaft mounted in said bearings, means for detachably locking said driven wheel to said keeper shaft, power transmission means for connecting said wheels in driving relationship, said keeper shaft being slidable from said bearing assembly and drive wheel upon release of said locking means whereby the shank of a tool may be inserted in said openings and employed to push out the keeper shaft while maintaining said driven wheel in its position aligned with said bearings, said locking means being effective to lock the shank of the tool in rigid driving relationship with said driven wheel.

2. An offset attachment for milling machines and the like comprising a rigid arm, means for rigidly securing said arm to the quill of a milling machine in a position extending laterally therefrom, a drive wheel having a shaft for mounting in the collet of a milling machine, spaced supporting fingers on the outer end of said arm, said fingers having openings therein arranged in alignment on an axis parallel to the driving axis of the machine, axial thrust transmitting bearings mounted in said openings and movable under pressure parallel to said axis, one of said fingers having a shoulder extending into its opening on the outer side thereof to seat the bearing therein and receive axial thrust transmitted through the bearing, a driven wheel mounted between said bearings and engaging the rotatable elements thereof in axial thrust transmitting relationship, power transmission means for connecting said wheels in driving relationship, spring means for urging the bearing in the other of said openings axially toward said shoulder whereby said bearings and driven wheel are retained in thrust transmitting relationship, a shaft mounted for rotation in said bearings, and means for detachably securing said driven wheel to said shaft for rotation on said bearings.

3. An offset attachment for milling machines and the like comprising a rigid arm, means for rigidly securing said arm to the quill of a milling machine in a position extending laterally therefrom, a drive wheel having a shaft for mounting in the collet of a milling machine, spaced supporting fingers on the outer end of said arm, said fingers having openings therein arranged in alignment on an axis parallel to the driving axis of the machine, axial thrust transmitting bearings mounted in said openings and movable under pressure parallel to said axis, one of said fingers having a shoulder extending into its opening on the outer side thereof to seat the bearing therein and receive axial thrust transmitted through the bearing, a driven wheel mounted between said bearings and engaging the rotatable elements thereof in axial thrust transmitting relationship, power transmission means for connecting said wheels in driving relationship, spring means for urging the bearing in the other of said openings axially toward said shoulder whereby said bearings and driven wheel are retained in thrust transmitting relationship, a cutting tool having a shank mounted for rotation in said bearings, means for detachably locking said driven wheel to said shank whereby said tool is driven by said transmission means, and means for mounting said arm on said fixture with said shoulder positioned alternatively to receive thrust from either direction along said axis whereby said cutting tool may be mounted alternatively to extend from said arm in either direction along the axis of rotation and transmit the thrust thereof to said shoulder.

References Cited in the file of this patent
UNITED STATES PATENTS

| | | |
|---|---|---|
| 1,296,854 | Ross | Mar. 11, 1919 |
| 2,718,820 | Faselt | Sept. 27, 1955 |

OTHER REFERENCES

American Machinist, Mar. 2, 1944, p. 102.